Figure 1:
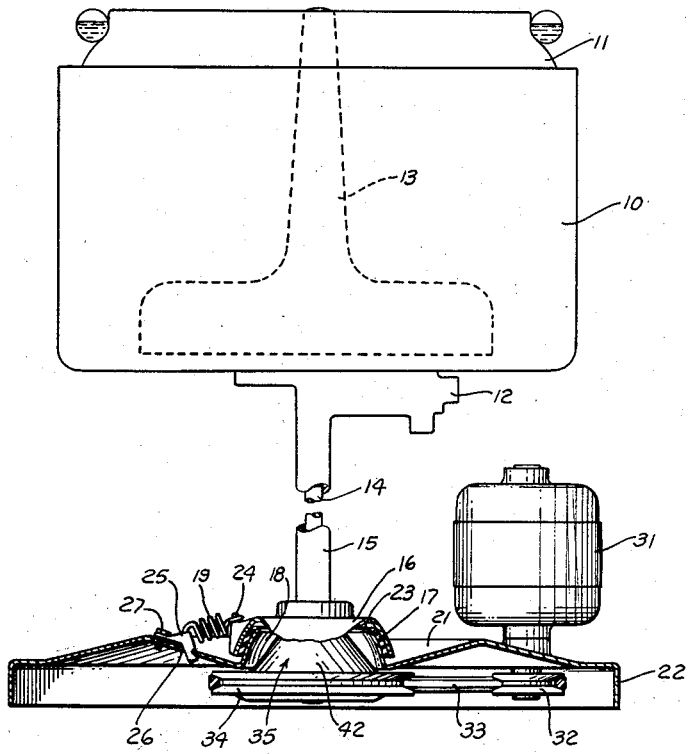

Aug. 9, 1960  J. D. GOODLAXSON  2,948,372
DRIVE ASSEMBLY
Filed May 2, 1955  2 Sheets-Sheet 1

Inventor
John D. Goodlaxson
by Wilkinson Huxley Byron & Hume
Attorneys

Aug. 9, 1960 J. D. GOODLAXSON 2,948,372
DRIVE ASSEMBLY
Filed May 2, 1955 2 Sheets-Sheet 2
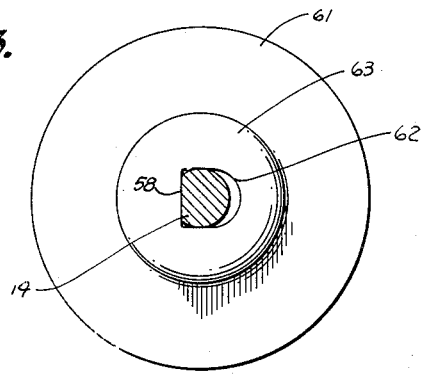
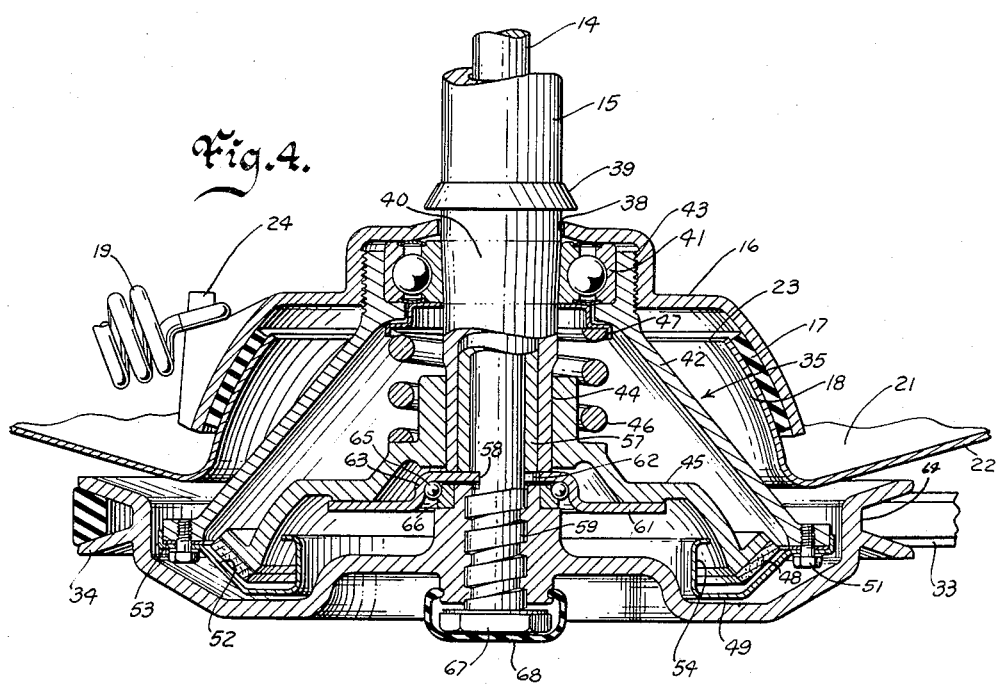
Inventor
John D. Goodlaxson
by Wilkinson Huxley Byron & Hume
Attorneys

United States Patent Office 2,948,372
Patented Aug. 9, 1960

2,948,372
DRIVE ASSEMBLY

John D. Goodlaxson, Colfax, Iowa, assignor to The Maytag Company, Newton, Iowa, a corporation of Delaware Filed May 2, 1955, Ser. No. 505,231

12 Claims. (Cl. 192—18)

This invention relates to a drive mechanism for an automatic washing machine of the vertical axis type. Specifically, it is directed to a unique clutch and brake mechanism mounted on an umbrella-shaped support member which is resiliently centered on a mating dome-like base member to permit nutational as well as rotary movements to be imparted to a pair of concentric output shafts driving tub and agitator assemblies supported by the umbrella member.

While this invention is primarily concerned with a drive mechanism capable of supporting and driving one or both of two concentric shafts in a vertical axis washing machine such as that disclosed in the Thomas R. Smith Patent No. 2,645,108, issued July 14, 1953, and entitled Combined Washing Machine and Centrifugal Fluid Extractor and assigned to the same assignee as instant application, its use need not be limited to such an application. This application is related to application Serial No. 505,251, filed May 2, 1955.

The invention disclosed hereinafter relates to a drive mechanism in which a supporting member journals two concentric shafts, one of which is a power input shaft receiving its power through a pulley, sheave, etc., thereon through a bi-directional source such as a reversible motor. With this disclosed construction, it is possible to rotate the sheave in one direction to impart movement only to the power shaft while the second concentric shaft is restrained against rotation by a braking device. However, when the sheave is rotated in the opposite direction, it climbs a helix carried on the power shaft to engage and move a clutch member which not only releases the braking engagement on the second shaft but also drives the second shaft in unison with the power shaft. In the embodiment shown in the accompanying figures the support member is tiltably mounted on a stationary base frame member to permit gyratory movements of the tub assembly driven and supported by the concentric output shafts of the driving mechanism.

One of the objects of this invention is to supply a simple, compact and economical drive mechanism for imparting rotary movement to one or both of two concentric shafts supporting and driving a tub assembly and its associated agitator drive mechanism mounted on these shafts.

Another of the objects of this invention is to provide a drive mechanism for an automatic washing machine in which rotary movements may be imparted to one or both of two coaxial shafts as determined by the direction of rotary movements imparted to the input sheave without requiring the use of additional switches, timer cams or solenoids to actuate the clutch and brake parts controlling the movements of these shafts.

A further object of this invention is to provide a self-energizing brake for an output shaft of a driving mechanism so that the output shaft is immediately braked upon an interruption of power to the driving mechanism.

Figure 2:
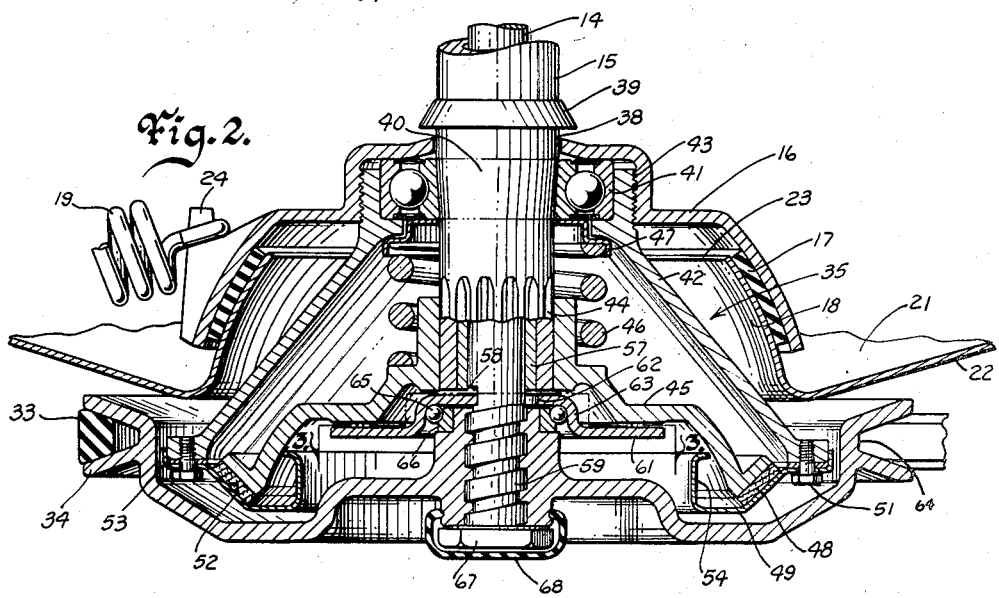

Other objects, advantages and features of this invention will be more apparent when reference is made to the following specification and drawings in which:

Figure 1 is an elevation, partially in section, of a washing machine embodying my drive mechanism, Figure 2 is an elevation, mostly in section, showing the relative positions of the parts of my drive assembly during the agitation period when the input pulley of the drive assembly is rotated in one direction, Figure 3 is a horizontal cross-section taken on line 3—3 of Figure 2, and Figure 4 is a vertical elevation similar to that of Figure 2 showing the relationship of the parts of my drive assembly during the spin period when the input pulley is rotated in an opposite direction.

The general organization of a vertical axis type washing machine embodying my drive assembly may be understood by reference to Figure 1.

In that figure, outer tub 10 and its inner basket 11 are integrally connected to casing 12 which houses the motion converting mechanism driving agitator 13. As disclosed in the identified Smith Patent No. 2,645,108, the double tub assembly formed from tub 10 and basket 11 is restrained against rotation during the agitation period when the rotation of power shaft 14 is converted into an oscillatory movement by the motion converting mechanism within casing 12 to drive agitator 13 in a conventional manner. During the spin periods of the washing cycle, casing 12, attached to its supporting shaft 15, is permitted to rotate with shaft 14 to rotate the tub assembly and centrifugally extract moisture from fabrics carried within the tub assembly.

In this invention the outer shaft or tube 15 is journalled in an umbrella-like member 16 resiliently centered on the friction pads 17 of mating dome member 18 by the three equally spaced springs 19. Supporting dome 18 rises from the bottom of a shallow frusto-conical depression 21 in the center portion of base member 22 and is provided with an opening 23 permitting shafts 14 and 15 to extend through base member 22.

The periphery of umbrella member 16 is provided with three ears 24 to which the three springs 19 are respectively attached. Each of these springs is attached to the vertex of an L-shaped bracket member 25 having a first notched bifurcated leg fitted into a pair of radial slots 26 in base 22 and a second leg fastened to base member 22 by means of an anchor screw 27 threaded into that base member. This not only centers and restrains umbrella member 16 against rotation but also provides a means for adjusting the tension of each of these springs 19 holding member 16 on dome 18.

Base member 22 also supports the reversible motor 31 which is mounted on the top side of base member 22 and which drives its attached power pulley 32 beneath the base 22. Pulley 32 is connected by V-belt 33 to the power input sheave 34 of the drive assembly generally indicated by the arrow 35. Through the use of this invention the direction of rotational movement imparted by reversible motor 31 to sheave 34 determines whether one or both of shafts 14 and 15 are rotated.

Referring now to the details of the drive assembly 35 as shown in Figure 2, it can be seen that both shafts 14 and 15 pass freely through opening 38 at the top of umbrella member 16 and terminate below base member 22. Deflector seal 39 fitted around tube 15 prevents oil, water, etc., which may possibly drain down tube 15 from working into the parts of the drive assembly and impairing its operation.

While the connections of shaft 14 within casing 12 prevent axial movements of this shaft relative to its concentric tube 15, tube 15 is maintained in its vertical position solely by means of its support on umbrella member 16. With this construction the weight of the tub assembly so supported may be used to an advantage to provide an ample frictional force between umbrella member 16 and friction pads 17 for dampening gyratory shaft movements. To accomplish this end, shaft 15 is provided with a tapered portion 40 seated in the mating tapered inner race of thrust bearing 41. The outer race of bearing 41 is gripped between umbrella member 16 and stator support member 42 by means of right hand threads 43 holding these two latter members together in an integral unit. Though members 16 and 42 have been threaded into each other in this embodiment, they may be fastened together by other methods without changing the primary functions of either part.

As apparent from Figure 2, the lower end of tube 15 is provided with splines 44 which fit into rotor member 45 and allow the latter member to move relative to shaft 15 in an axial direction only. Rotor 45 is urged downwardly by a large coil spring 46 encircling shaft 15 and abutting rotor 45 and a spring retainer member 47 which in turn presses upwardly against the inner race of thrust bearing 41.

Spring 46 moves rotor 45 downwardly until brake lining 48, cemented to the bevelled edge of rotor 45, engages brake stator 49 which is fastened to stator support member 42 by means of cap screws 51 threaded into the latter member. Use of these mating bevelled rotor and stator parts produces a higher unit loading on lining 48 for a given size spring than would be achieved through the positioning of these same parts in a horizontal plane. Stator 49 presents a stationary brake surface 52 to rotor 45 and serves as a reservoir for a small quantity of lubricating fluid in case it is desired to use a lubricated rather than a dry brake lining. Sealing gasket 53 and the annular flange 54 prevent the escape of this small quantity of lubricating fluid whenever a machine utilizing this drive assembly is tipped over on its side.

Fitted within the lower end of tube 15 is a bushing 57 which journals the power shaft 14 extending beyond the lower end of shaft 15. This lower extension of shaft 14 is provided with a flat 58 and a helix 59 which approach but do not merge into each other.

A clutch member 61, which has a D-shaped opening 62 in its raised central portion 63 slides over helix 59 and, when moved laterally of shaft 14 and centered with respect to that shaft, is free to move axially of that shaft while being restrained against rotation relative to that shaft by flat 58. (Note Figure 3.)

Sheave 34, which is powered through V-belt 33 by means of the reversible motor 31, is threaded on helix 59 to permit its vertical travel on shaft 14 as determined by the direction of rotational movements imparted to it by motor 31.

Driven pulley 34 is contoured to cover and protect the rotor and stator structure and also to provide a V-groove 64 lying in the same plane as the pivot point for shaft 14. It should be noted that while shaft 15 and its inner shaft 14 are supported by dome member 18, these concentric shafts actually pivot on a point determined by the intersection of the radii of curvature of this dome. In this modification, this point is also the intersection of the shafts' axis of rotation with the horizontal plane bisecting the V-groove 64 to minimize changes in belt tension during the gyratory movements of the shafts.

The central portion 63 of clutch member 61 serves as the outer race for balls 65 which permit relative rotary movement between clutch member 61 and sheave 34 while a hardened insert 66 fitted on the hub of sheave 34 provides the inner race for these balls.

Sheave 34 is prevented from turning itself off the bottom of shaft 14 by a left hand cap screw 67 threaded into the lower end of shaft 14. With this construction a spiral movement of sheave 34 downwardly against cap screw 67 tends to tighten screw 67 into shaft 14. Resilient seal 68 provides a means for keeping foreign matter out of the helix 59 and the space between the abutting surfaces of sheave 34 and screw 67.

In operation, when no power is supplied to the drive assembly described, the parts assume the position shown in Figure 2. In this position outer shaft 15 is held in a braked position as rotor 45, splined to shaft 15, is urged against stator 49 by the large coil spring 46. Since stator 49 is in effect an integral part of umbrella member 16 which cannot rotate due to the anchoring action of centering springs 19, shaft 15 may only nutate on friction pads 17 of dome member 18.

During the agitation period when motor 31 rotates pulley 34 in a counter-clockwise direction as viewed from the bottom of the drive assembly, sheave 34 screws downwardly on shaft 14 until it abuts cap screw 67. Further rotation of sheave 34 imparts the same direction of rotary movement to shaft 14 which oscillates agitator 13 through the motion converting mechanism housed within casing 12. Tub 10 which is connected to shaft 15 through casing 12 is restrained against rotary or oscillatory movement because of the continuing braking engagement maintained between rotor 45 and stator 49.

During the fluid extraction period when motor 31 is reversed and sheave 34 is rotated in a clockwise direction as viewed from the bottom of the assembly, sheave 34 rotates clockwise relative to shaft 14 and climbs helix 59. It should be noted at this point that relative rotation between sheave 34 and shaft 14 is possible because of the inertia offered by the agitator mechanism connected to shaft 14.

While clutch member 61 remains in a centered position at all times because of the centering action of balls 65 and inner race 66 which support it, member 61 does not contact rotor 45 when no power is supplied to motor 31 or when sheave 34 is seated against cap screw 67 as shown in Figure 2. However, during the fluid extraction period when sheave 34 is screwed upwardly on helix 59, clutch member 61 slides axially on flat 58 as sheave 34 moves balls 65 upwardly against central portion 63. This causes the clutch member 61 to engage and lift rotor member 45 away from stator 49 against the action of compression spring 46.

While sheave 34 rotates relative to shaft 14 when climbing helix 59, no rotary movement is initially imparted to member 61 on shaft 14. However, when member 61 is prevented from traveling upwardly because of its abutting the lower end of shaft 15, sheave 34 attempts to wedge itself in helix 59 and against balls 65. This not only drives shaft 14 but also creates a power path from sheave 34 through flat 58 and clutch member 61. Further rotation of sheave 34 in a clockwise direction causes clutch member 61 to rotate rotor 45 through the frictional coupling between these latter two members. This turns outer shaft 15 in unison with the inner shaft 14 to spin tub 10 and basket 11 during the centrifuging operation. Though various clutch facings may be used on rotor 45 or clutch member 61 to gain a greater coefficient of friction than may be available through the use of the metal clutch parts used in this embodiment, the size of the spring 46 and the small rotary movement between these clutch parts make such facings unnecessary in this embodiment. If spring 46 is of a magnitude great enough to prevent clutch member 61 from ever abutting the lower end of spin tube 15, rotation of that latter tube will naturally commence upon the separation of rotor 45 from stator 49 once relative movement between sheave 34 and shaft 14 has ceased. The cessation of rotation between parts 45 and 49 will be reached once the forces acting on sheave 34 by spring 46 are in equilibrium with those produced by the power imparted to sheave 34.

At the end of the spin dry period when there is an interruption of power to motor 31 and a corresponding cessation of clockwise driving power to rotating sheave 34, sheave 34 tends to reduce its clockwise rotational speed. However, the inertia exerted by the rotating tub assembly on the frictionally coupled shafts 14 and 15 tends to maintain these shafts spinning in unison at their driven speed. This causes relative rotation between sheave 34 and the spinning unit formed from members 14, 15, 45 and 61 so that sheave 34 actually rotates counter-clockwise relative to these parts. This in turn causes sheave 34 to spiral downwardly on helix 59 and decrease its upwardly directed force exerted on rotor 45 through balls 65 and clutch member 61. When the upwardly directed force acting on rotor 45 is decreased, spring 46 then pushes rotor 45, clutch member 61 and balls 65 downwardly in an attempt to again establish a state of equilibrium for rotor member 45. This downward movement of sheave 34 causes rotor 45 to engage stator 49 and also separates the driving connection between clutch member 61 and rotor 45.

The engagement of brake lining 48 on rotor 45 with surface 52 of stator 49 quickly stops the rotation of shaft 15 and the tub assembly connected to that shaft. Shaft 14 also comes to a quick stop once it has been disconnected from shaft 15 permitting the drag forces of pulley 34 and motor 31 to slow it down.

It should be noted that the braking action between rotor 45 and stator 49 tends to tighten the threaded engagement between umbrella member 16 and stator support member 42 due to the use of right hand threads 43 connecting parts 16 and 42.

It should also be noted that the tub assembly supported on shafts 14 and 15 may be nutated on dome member 18 at all times while shaft 15 may be rotated only during the clockwise rotation of sheave 34 by motor 31. This provides a flexible tiltable support for the tub assembly in addition to a means preventing any oscillation of tub 10 during the agitation periods. It also provides a drive mechanism which will fail safe in case of emergency and immediately stop all parts from rotating if power to motor 31 is disconnected.

While only one embodiment of my invention has been shown in the accompanying drawings, it is understood that modifications of this embodiment may be made without departing from the scope of the invention as set forth in the following claims.

I claim:

1. In a drive assembly comprising, a support, a first shaft journalled in said support, a rotor connected to and axially moveable on said first shaft, a brake stator connected to said support, means urging said rotor against said stator to brake rotary movements of said first shaft relative to said support, a second shaft coaxial to said first shaft, a helix on said second shaft, a driven member threaded on said helix, drive means for rotating said driven member, and clutch means controlled by said driven member for moving said rotor away from said stator and rotating said first shaft with said driven member.

2. A drive assembly comprising, a support, a first shaft journalled in said support, a rotor connected to and axially slideable on said first shaft, a brake stator connected to said support, means urging said rotor against said stator to brake rotary movements of said first shaft relative to said support, a second shaft coaxial to said first shaft, a helix on said second shaft, a driven member threaded on said helix, reversible drive means for rotating said driven member, and clutch means moveable against said rotor by unidirectional rotary movements of said driven member for separating said rotor from said stator and driving said rotor and said first shaft with said driven member.

3. In a drive assemby having first and second concentric output shafts, means for selectively rotating one of said shafts in one direction and both of said shafts in an opposite direction, comprising, a support for said shafts, a rotor connected to and axially slideable on said first shaft, a brake stator, means resiliently urging said rotor against said stator to brake rotary movements of said rotor and said first shaft relative to said support, a helix on said second shaft, a power input member threaded on said helix and controlling movements of said clutch member and said second shaft, and reversible drive means for rotating said input member in one direction to drive said second shaft in a first direction and for rotating said input member in an opposite direction to move said clutch member against said rotor and drive both of said shafts in a second direction.

4. In a drive assembly, a support, a first shaft journalled in said support, a brake stator, a rotor connected to and axially slideable on said first shaft, resilient means urging said rotor into braking position against said stator, a second shaft coaxial to said first shaft, a clutch member axially slideable on and rotatable with said second shaft, a bearing contacting said clutch member in concentric relationship with said second shaft, a helix on said second shaft, and rotatable drive means threaded on said helix and contacting said bearing for moving said clutch member and said rotor away from said stator against the urging of said resilient means.

5. In a drive assembly, a support, a tube journalled in said support, a rotor connected to and axially slideable on said tube, resilient means urging said rotor against said stator to brake rotary movements of said tube relative to said support, a shaft journalled in said tube, a clutch member axially slideable on said shaft and engageable with said rotor, a helix on said shaft, a power input member threaded on said shaft for spiral movements toward and away from said clutch member, abutment means limiting movement of said power input member away from said clutch member, and reversible drive means for rotating said power input member in one direction against said abutment means and in an opposite direction toward said clutch member.

6. In a drive assembly having first and second concentric output shafts positioned on a vertical axis, a support member, a thrust bearing in said support member journalling said first shaft on a vertical axis, a rotor connected to and axially slideable on said first shaft, a stator connected to said support member, means resiliently urging said rotor against said stator to brake movements of said rotor and said first shaft relative to said support member, a clutch member engageable with said rotor, a helix on said second shaft, a power input member threaded on helix and controlling movements of said clutch member and said second shaft, and reversible drive means for rotating said power input member in one direction to drive said second shaft in a first direction and for rotating said power input member in an opposite direction to move said clutch member against said rotor and drive both of said shafts in a second direction.

7. In a drive assembly, a support member, a tube journalled on a vertical axis by said support member, a rotor splined on said tube, a brake stator connected to said support member, means urging said rotor into braking engagement with said stator to resist rotary movements of said rotor and said tube relative to said support member, a shaft journalled in said tube, a clutch member engageable with said rotor to separate said rotor from said stator and establish a driving connection between said clutch member and said rotor, a helix on said shaft, a power input member threaded on said helix controlling movement of said clutch member and said shaft, and reversible drive means for rotating said power input member in one direction to drive said shaft in a first direction and for rotating said power input member in an opposite direction to move said clutch member against said rotor and drive said tube with said shaft in a second direction.

8. In a drive assembly, a first revoluble shaft, a rotor connected to said first shaft, a brake stator, means urging said rotor against said stator to brake relative movements between said rotor and said stator, a second revoluble shaft coaxial to said first shaft, a clutch member moveable toward and away from said rotor to control rotary movements of said rotor, a power input member threaded on said second shaft for spiral movements toward and away from said clutch member, abutment means limiting movement of said power input member away from said clutch member, and reversible drive means for rotating said power input member in one direction against said abutment means and in an opposite direction toward said clutch member.

9. In combination: a frame, a mounting surface of a partly spherical configuration on said frame, an opening formed in said mounting surface, a support member mating with and supported by said mounting surface, a first shaft journalled in said support member having an extension projecting through said opening, a resilient system for maintaining said first shaft in an upstanding position, a rotor on said extension of the first shaft, a brake stator positioned to be engaged by said rotor connected to said support member, means urging said rotor into braking engagement with said stator, a second shaft journalled in and provided with an extension protruding beyond said first shaft, power input means threaded on said extension of the second shaft controlling movements of said rotor relative to said stator, and reversible drive means for rotating said power input means.

10. In combination: a frame, a mounting surface of a partly spherical configuration on said frame, an opening formed in said mounting surface, a support member mating with and supported by said mounting surface, a first shaft journalled in said support member having an extension projecting through said opening, a resilient system for maintaining said first shaft in an upstanding position, a rotor on said extension of the first shaft, a brake stator positioned to be engaged by said rotor connected to said support member, means urging said rotor into braking engagement with said stator, a second shaft journalled in and provided with an extension protruding beyond said first shaft, power input means threaded on said extension of the second shaft for moving said rotor away from said stator and driving said first shaft with said power input means, and reversible drive means driving said power input member.

11. In combination: a frame, a mounting surface of a partly spherical configuration on said frame, an opening formed in said mounting surface, a support member mating with and supported by said mounting surface, a first shaft journalled in said support member having an extension projecting through said opening, a resilient system for maintaining said first shaft in an upstanding position, a rotor axially slideable on said extension of the first shaft, a brake stator positioned to be engaged by said rotor connected to said support member, means urging said rotor against said stator, a second shaft journalled in and provided with an extension protruding beyond said first shaft, a clutch member, power input means threaded on said extension of the second shaft for moving said clutch member against said rotor to separate said rotor from said stator and establish a driving connection between said first and second shafts, and reversible drive means driving said power input means.

12. In combination: a frame, a mounting surface of a partly spherical configuration on said frame, an opening formed in said mounting surface, a support member mating with and supported by said mounting surface, a first shaft journalled in said support member having an extension projecting through said opening, a resilient system for maintaining said first shaft in an upstanding position, a rotor connected to and axially slideable on said extension of the first shaft, a brake stator positioned to be engaged by said rotor connected to said support member, means resiliently urging said rotor against said stator to brake rotory movements of said first shaft relative to said support member, a second shaft coaxial to said first shaft, a clutch member mounted adjacent said rotor on said second shaft, means on said second shaft restraining relative rotational movement between said clutch member and said second shaft, a helix on said second shaft, and rotatable drive means threaded on said helix for moving said rotor away from said stator and driving said first shaft through said clutch member and said rotor.

References Cited in the file of this patent

UNITED STATES PATENTS

| | | |
|---|---|---|
| 442,469 | Weston | Dec. 9, 1890 |
| 2,331,897 | Dyer | Oct. 19, 1943 |
| 2,375,635 | Dyer | May 8, 1945 |
| 2,391,955 | Eason | Jan. 1, 1946 |
| 2,441,926 | Zahn et al. | May 18, 1948 |
| 2,629,469 | Dayton | Feb. 24, 1953 |
| 2,751,773 | Woodson | June 26, 1956 |
| 2,826,056 | Bruckman | Mar. 11, 1958 |
| 2,841,260 | Lodge | July 1, 1958 |